United States Patent [19]
Bischof

[11] Patent Number: 5,700,435
[45] Date of Patent: Dec. 23, 1997

[54] METHOD AND APPARATUS FOR SEPARATING A SUBSTANCE FROM A LIQUID MIXTURE BY FRACTIONAL CRYSTALLIZATION

[75] Inventor: Rudolf Bischof, Sevelen, Switzerland

[73] Assignee: Sulzer Chemtech AG, Winterthur, Switzerland

[21] Appl. No.: 566,792

[22] Filed: Dec. 4, 1995

[30] Foreign Application Priority Data

Dec. 8, 1994 [CH] Switzerland ............ 03 716/94

[51] Int. Cl.$^6$ .................................. C30B 7/08
[52] U.S. Cl. .............. 422/245.1; 23/295 R; 422/251
[58] Field of Search .................. 23/295 R, 301; 117/11, 12; 422/245.1, 251

[56] References Cited

U.S. PATENT DOCUMENTS

| | | | |
|---|---|---|---|
| 2,743,996 | 5/1956 | Hachmuth | 422/251 |
| 3,272,875 | 9/1966 | Gordon et al. | 568/938 |
| 3,859,052 | 1/1975 | Walther | 23/273 R |
| 4,004,886 | 1/1977 | Thijissen et al. | 23/273 F |
| 4,296,612 | 10/1981 | Allo | 62/123 |
| 5,127,921 | 7/1992 | Griffiths | 23/295 R |
| 5,466,266 | 11/1995 | Griffiths | 23/295 R |

FOREIGN PATENT DOCUMENTS 1 052 023 1/1954 France .
1 218 743 1/1971 United Kingdom .

*Primary Examiner*—Felisa Garrett
*Attorney, Agent, or Firm*—Frishauf, Holtz, Goodman, Langer & Chick, P.C.

[57] ABSTRACT

The crystalliser (70) has an inlet (77) for the crystal medium to be fractionated and an outlet (84) from which the mother liquor followed by the molten crystals can be withdrawn at the end of the crystallisation process. During the crystallisation process, a number of tubes (75) closed at the top can be supplied from above with a trickling film of liquid mixture. The tubes are internally supplied with a trickling film of a liquid heat exchange medium used for cooling. The liquid heat exchange medium is supplied via a riser (87), and a medium distributor (92) guides the flow of medium heat exchange under the distribution tray (81). The pressure of the evaporating coolant in the medium chamber (80), to which the inner space of the tubes also belongs, is controlled, thus controlling the temperature of the wall of the tubes where crystallisation takes place. In order to melt the crystals, gaseous heat exchange medium is introduced through a spigot (96) into the crystalliser under controlled pressure. The crystalliser can serve selectively as an evaporator or as a condenser in a refrigeration machine, in order to use both cooling energy and waste heat from the machine.

20 Claims, 3 Drawing Sheets

METHOD AND APPARATUS FOR SEPARATING A SUBSTANCE FROM A LIQUID MIXTURE BY FRACTIONAL CRYSTALLIZATION

FIELD OF THE INVENTION

The invention relates to a method of separating substances from a liquid mixture by fractional crystallisation by depositing a crystal layer on one side of a wall of a crystalliser which is cooled on the other side, and subsequently melting the crystal layer.

BACKGROUND

Crystallisation processes are becoming increasingly important, in addition to the prevailing distillation method. There are various reasons for this. An advantage of crystallisation, for example, is that heat-sensitive substances can be obtained or purified at low temperatures. Also no expensive vacuum equipment is needed, in contrast to vacuum distillation. In many cases, higher purity can be obtained than by distillation.

Another important advantage of crystallisation over distillation is the energy costs, which are usually lower. Admittedly cooling energy is usually much more expensive than heat energy. Even so, the total cost of energy for separating substances by crystallisation is usually much lower than when the substances are separated by distillation, simply because the energy required for separating substances by crystallisation is usually much less than when substances are separated by distillation.

U.S. Pat. No. 3,272,875 describes a crystalliser comprising tubes through which a coolant flows and the outer wall of which serves as a crystallisation surface. The coolant circuit is a secondary circuit and conveys liquid coolant from the outlet of a circulating pump to one end of the tubes, through the tubes, from the other ends of the tubes to a heat exchanger and thence back to the circulating pump. The heat exchanger is for transferring cooling energy from a primary circuit, i.e. the circuit of a cooling system. The product circuit leads from a product-circulating pump to the outer walls at one end of the tubes and from the other ends of the tubes to a heat exchanger and back to the product circulating pump. The heat exchanger in the product circuit receives heat energy from a heat source.

During operation of the aforementioned crystallizer, a crystal layer forms on the outer wall of the tubes. The specification gives no details of how the crystal layer is removed. It is known, however, that after the mother liquor has been drawn off from the product circuit, the crystal layer can be melted either by increasing the temperature in the cooling circuit or by introducing and circulating previously produced product. The heat energy necessary for melting can be supplied through the heat exchanger disposed in the product circuit. The cited specification describes the process only on a laboratory scale. No information is given as to how the process described can be put into practice in industry. More particularly, there are no details about a multi-stage crystallisation process. Clearly, however, the need for a number of heat exchangers will result in expensive apparatus. Owing to the resulting energy losses and the chosen process conditions, the energy requirement will be large, a particularly important item being the expensive cooling energy.

Efforts have long been made to reduce the cost of apparatus and energy required for fractional crystallisation. For example, DE-A-17 69 123 proposes cooling the crystalliser directly via the medium in the cooling plant, by removing vapour from the jacket space of the crystalliser. No details, however, are given about putting this into practice, and also no directly-cooled crystallisers have become known during the twenty-four years since publication of the cited specification.

In the crystalliser according to DE-A-17 69 123, in contrast to the crystalliser in the initially-mentioned U.S. Pat. No. 3,272,875, the tubes are cooled from the exterior and the liquid mixture is supplied from above in a film trickling down the inside of the tubes. Also, a crystalliser is not required for each stage of a multi-stage crystallisation process. Instead, multi-stage crystallisation is brought about in different cycles in a single crystalliser. In order further to reduce the energy costs, it is proposed that the heat evolved in the condenser in the cooling plant should partly be stored in a heating-medium tank and subsequently used, via a heat exchanger in the product circuit, for melting the crystals. Excessive heat is discharged in cooling water or, in extreme cases, via a second cooling plant. The disadvantages of this known method are the high cost of apparatus and the energy losses during storage and conversion of energy.

THE INVENTION

The object of the invention is to devise a method which needs less energy, particularly less expensive cooling energy, and also needs less complicated apparatus than previous methods.

The novel method of separating crystallizable substances from a crystal medium, e.g. in form of a liquid mixture by fractional crystallisation by depositing a crystal layer on a wall of a crystalliser is characterised, according to the invention, in that for the purpose of crystallisation the crystal medium is evaporated: on the other side of the wall, a heat exchange medium is conducted, the pressure of the gaseous phase of the heat exchange medium in the crystalliser is controlled in accordance with the temperature required for crystallization. Since in this method the crystalliser operates as an evaporator for the heat exchange medium used for cooling, such as ammonia or water, etc., no heat exchanger is needed for transferring cooling energy from the coolant circuit of a refrigerating machine to the coolant circuit of the crystalliser. This also eliminates the resulting energy losses. The process temperature can be controlled in optimum manner by controlling the pressure of the gaseous phase of the medium.

Advantageously, the crystal medium is made to trickle in a film down the wall. This results in uniform cooling of the wall, as is desirable for the crystallisation process.

Advantageously, the crystal medium supplied for melting the crystal layer or for sweating in the gaseous state is condensed on the wall, and the pressure of the gaseous heat exchange medium is adjusted in accordance with the temperature required at the wall. This eliminates the need for a heat exchanger for supplying heat energy. The process temperature can be controlled in optimum manner by controlling the pressure of the gaseous phase of the heat exchange medium.

Particularly advantageously, at least one crystalliser is used for crystallisation and at least one other crystalliser is used for melting the crystals, and the heat exchange medium in gaseous phase occurring in one crystalliser during crystallisation is compressed and is condensed for melting the crystals in the other crystalliser. Consequently one crystalliser acts as a condenser in alternation with the other crystalliser operating as an evaporator in a refrigerating machine. In this manner both the cooling energy and the waste heat from the refrigerating machine are directly used. The total resulting energy saving is 30% or more, compared with conventional methods. The refrigerating machine can therefore be made smaller than in the prior-art methods.

According to a particularly advantageous embodiment of the method, during the melting process, the crystalliser is additionally supplied with external heat energy, and the excess heat energy is subsequently discharged. This enables the process to be made much more flexible. For example the crystals can be melted more quickly than the crystallisation process, if external heat energy is additionally supplied to the crystalliser during the melting process, and the excess heat energy is subsequently discharged. The refrigerating machine can always be operated independently of the amount of process heat required at a given moment. By this means, by controlling the pressures, each crystalliser can be operated independently of the others. It is thus possible to operate with temperature gradients, triggering temperatures, heating gradients for partial melting, etc.

The invention also relates to an apparatus for working the method. The apparatus comprises a crystalliser having a casing, in which the crystallisation space is separated from the heat exchange medium space by a wall on which crystals can be deposited, and the medium space has at least one inlet and one outlet for liquid heat exchange medium. According to the invention at least one connection is provided for the inflow and outflow of the gaseous phase of the medium, and means for controlling the pressure of the gaseous phase of the heat exchange medium in the crystalliser.

The means for controlling the pressure of the gaseous phase of the heat exchange medium can e.g. be control flaps or valves which, on the basis of the pressures set by the process control, enable the gaseous phase of the medium to flow out of the crystalliser during the crystallisation process, and to flow into the crystalliser during the melting or sweating phase. As already mentioned in the description of the process, the process temperature can be controlled in optimum manner by controlling the pressure.

Advantageously an auxiliary evaporator is provided. If necessary the auxiliary evaporator can generate gaseous medium, preferably for a crystalliser operating as an evaporator, by evaporation of liquid medium. The auxiliary evaporator can operate on waste vapor. At any time, therefore, if more heat energy is needed than is produced during crystallisation, liquid medium is evaporated by waste vapour. This has the advantage that each crystalliser can be operated independently of the others. For example the crystals can be melted in a shorter time than the crystallisation process.

An auxiliary condenser, cooled e.g. with cooling water, can be provided for discharging excess heat energy after the crystals have melted. If steam or water is used as a medium, the auxiliary evaporator will not be needed. The pressure and consequently the temperature in the crystalliser can then be reduced by letting off steam.

In one advantageous embodiment of the invention, the wall is formed by at least one tube, preferably disposed vertically and closed at one end, and means are provided for conveying liquid crystal medium to the region of the closed end, from where it can trickle in a film down the wall. As explained in detail hereinafter, this results in a particularly advantageous construction of the crystalliser, which is leakage-proof even when the medium used is at relatively high pressure.

The liquid heat exchange medium is introduced preferably by means of a riser. In order not to interfere with crystallisation, the riser can be kept spaced from the wall by spacers.

In one advantageous embodiment of the apparatus, the crystalliser comprises a number of tubes which are permanently connected to a base at the bottom and project at the top through openings in a distribution tray, a gap being formed through which the liquid mixture for fractionation of crystal medium can flow downwards along the outer wall of the tubes. This construction ensures that when the temperature varies, the tubes can expand and contract independently of one another. Other advantages of the process and apparatus will be apparent from the detailed description, and will be clear from the following description.

DRAWINGS

An exemplified embodiment of the invention will now be described with reference to the drawing, in which.

DETAILED DESCRIPTION

The invention is particularly advantageous for multi-stage crystallisation using two or more crystallisers. The invention will therefore be described with reference to a multi-stage crystallisation process, but is not limited thereto. Since plants for multi-stage crystallisation are very well known to the skilled man, no details need be given here regarding the flow in these plants. Reference can be made to the relevant technical literature or to the specifications mentioned in the introduction.

Figure 1:
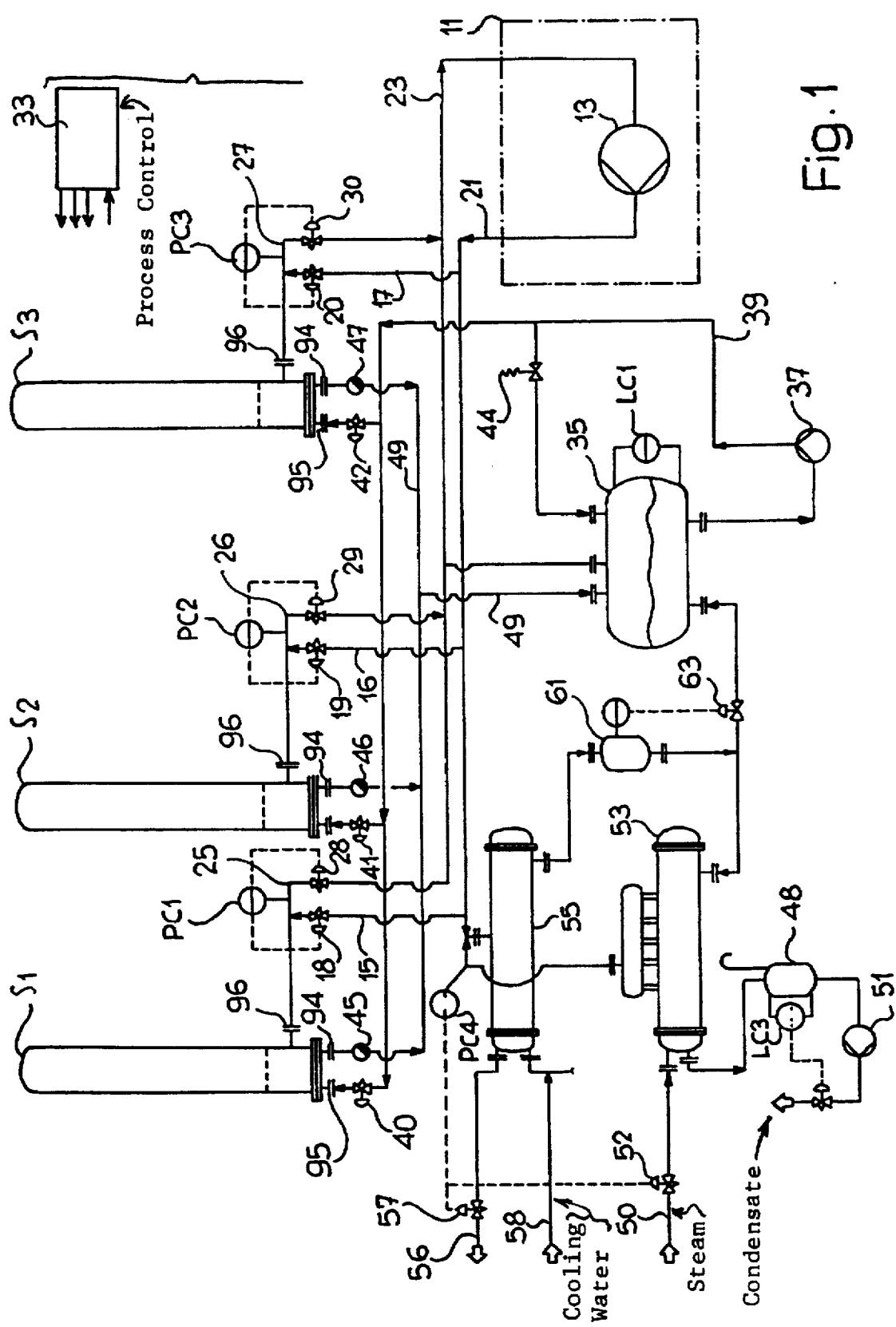
FIG. 1 is a diagram of the cooling system according to the invention for a plant for multi-stage fractional crystallisation.

FIG. 1 shows a crystallisation plant for multi-stage fractional crystallisation comprising e.g. three crystallisers S1, S2 and S3. Usually at least two crystallisers are always in operation simultaneously, one as an evaporator and the other as a condenser of a refrigerating machine 11. During crystallisation, one crystalliser operates as an evaporator; during melting, the crystalliser operates as a condenser. In the plant according to the invention, therefore, the refrigerating machine 11 does not comprise a conventional unit made up of a compressor 13 and evaporator and condenser. The evaporator and the condenser are taken out of the unit 11 and form a part of the crystallisers S1, S2 and S3. This presupposes that in principle at least one crystalliser always operates as an evaporator and at least one other operates as a condenser, unless an auxiliary condenser or an auxiliary evaporator is available. Even when a number of crystallisers operate simultaneously as evaporators or condensers in different stages of the process, the temperature of the wall on which crystals are formed can be kept different for each crystalliser. This can be done simply by controlling the pressure of the gaseous phase of the medium in each crystalliser in accordance with the temperature required at the wall. If the heat energy required is more than the waste heat generated by the refrigerating machine 11, an auxiliary evaporator 53 must be provided. The pressure of the gaseous medium in the crystallisers S1, S2, S3 is controlled by measuring and control devices PC1, PC2 and PC3 connected to the pipe 25, 26 and 27, the set pressure being determined by the process control 33.

A pipe 25, 26, 27 leads from the crystallisers S1, S2, S3 (FIG. 2: spigot 96) to a collecting pipe 23, which leads to the inlet side of the compressor 13. The collecting pipe 23 is at relatively low pressure, e.g. 2 bars. Control valves 28, 29, 30 can individually control the pressure of the gaseous medium, e.g. ammonia, in the crystalliser during the crystallisation process. This determines the evaporation temperature of the medium which cools the tubes of the crystalliser.

Figure 2:
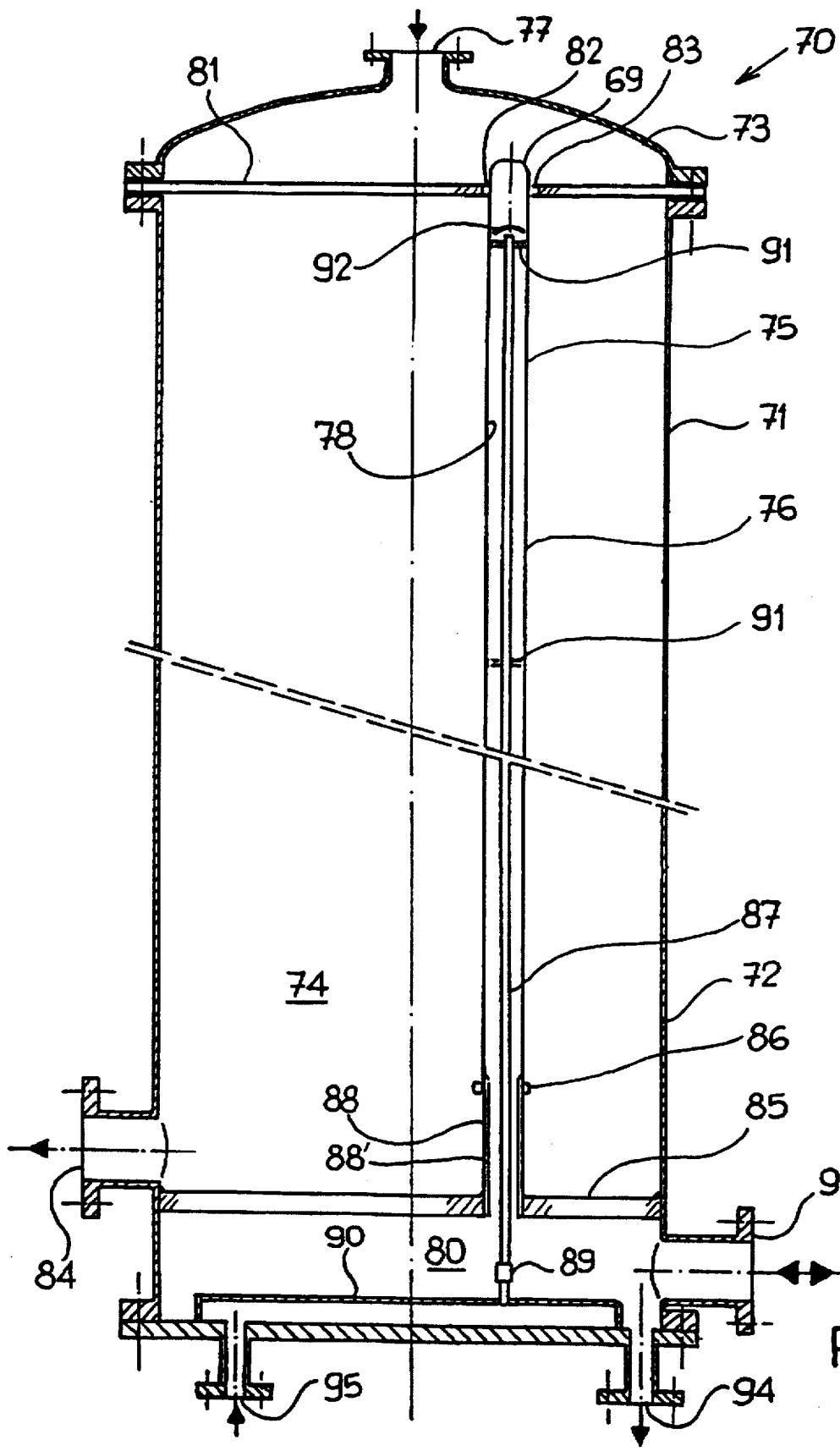
FIG. 2 shows a crystalliser particularly suitable for a cooling system according to FIG. 1.

Gaseous heat exchange medium from the pressure side of the compressor 13 is supplied through a distribution pipe 21 and branch pipes 15, 16, 17 to each crystalliser S1, S2, S3 (FIG. 2: spigot 96). The distribution pipe 21 is at relatively high pressure, e.g. 14 bar. Control valves 18, 19, 20 in the branch pipes 15, 16, 17 can individually control the pressure of the gaseous medium in each crystalliser S1, S2, S3 when the crystals are melted. This determines the condensation temperature of the medium heating the tubes of the crystalliser.

The set pressure and consequently the temperature during crystallisation and melting can be determined by the process control 33.

Liquid medium is conveyed from the collecting tank 35 to the crystallisers S1, S2, S3 by a pump 37, whose pressure side is connected to pipe 39. Reference LC1 denotes a liquid-level measuring and control device.

Control valves 40, 41, 42 admit liquid medium from pipe 39 to the crystallisers S1, S2 and S3. An overflow valve 44 between pipe 39 and tank 35 is used for setting a constant inlet pressure at the control valves 40, 41, 42. The process control 33 determines which crystalliser or crystallisers are to operate as evaporators and consequently which valves 40, 41, 42 are to be opened or closed. Each crystalliser S1 to S3 is connected to a liquid discharge trap 45, 46, 47 in order to supply excess cooling medium, or condensed medium when the crystalliser operates as a condenser, through pipe 49 to the collecting tank 35. The liquid discharge trap is designed so that it discharges liquid but not gas, so that the gaseous medium in the crystalliser remains at the same pressure.

The crystals can be melted in a much shorter time than it takes to form the crystals. If therefore one crystalliser is used for crystallization while crystals are melted in another crystalliser, the waste heat delivered by the refrigerating machine 11 is insufficient to bring about melting faster than crystallisation. Consequently external heat has to be supplied. Additional heat energy can be provided by an auxiliary evaporator 53, 55. The auxiliary evaporator 55 can operate on waste steam, e.g. via pipe 50 and valve 52. The valve 52 is controlled in accordance with the set pressure determined by the process control 33 and the pressure in the distribution pipe 21 measured by the measuring and control device PC4. The outlet of the auxiliary evaporator 53 is connected to the distribution pipe 21 in order to supply it with gaseous medium when the amount of heat energy consumed is greater than that produced at the same time by the refrigerating machine 11.

An auxiliary condenser 55 is provided for discharging excess heat energy. The auxiliary condenser 55 can be connected to a cooling-water circuit via lines 56, 58 and valve 57. The auxiliary condenser 55 is connected to the distribution pipe 21, in order to remove gaseous medium from it and condense it when less waste heat is consumed than that delivered at the same time by the refrigerating machine 11. The valve 57 is controlled in accordance with the set pressure determined by the process control 33 and the pressure measured by the device PC4. The medium liquefied by the auxiliary condenser 55 can flow into a tank 61 serving as a receiver for the collecting tank 35 and the auxiliary evaporator 53. Reference LC2 denotes a liquid-level measuring and control device LC2, which controls the valve 63.

Liquid medium is supplied from tank 61 to the collecting tank 35 via the valve 63.

Reference 48 denotes a tank for condensed vapour connected to the auxiliary evaporator 53. The condensate in tank 48 can be pumped back to the steam generator (not shown) by the pump 51. The process is initiated by the liquid-level measuring and control device LC3.

The crystallisers S1, S2, S3 in all stages can have the same construction. One exemplified embodiment of crystalliser is shown in FIG. 2. The crystalliser 70 substantially comprises a container 71 closed by a cover 73 above the distribution tray 81. A number of tubes 75 (only one is shown) are disposed in the container 71. They constitute the wall where crystallisation occurs. The crystal medium, which is to be crystallized, is supplied in form of a liquid mixture which can trickle in a film down the outer walls 76 of the tubes 75. The inlet 77 for the liquid mixture is in the cover 73. The distribution tray 81 has a number of openings 82 through which the tubes 75 closed at the top end 69 project upwards. The liquid mixture can then trickle in a film down through the gap 83. Crystals form as desired on the outer wall 76 owing to the cooling of the tube 75. The outlet 84 is in communication with the product tray 85. The liquid mixture can be recirculated from the outlet 84 to the inlet 77 in known manner, by a circulation pump (not shown) until the crystallisation process in this stage is complete.

The crystalliser 70 can serve alternately as an evaporator or as a condenser. To this end each tube 75 contains a riser 87 which leads into the tube 75 from a screw connection 89 provided for assembly reasons alongside a riser plate 90. The riser 87 is centred in the tube 75 by spacers 91. A coolant distributor 92 disposed at a distance from the top end of the riser 87 ensures that the medium used as coolant trickles in a film down the inner wall 78 of the tube 75, in order to cool the tube 75. In this arrangement of the coolant distributor 92, the top part of the tube 75 and the distribution tray 81 are not cooled, so that the liquid mixture can always flow unobstructed through the gap 83. If however the crystalliser is operating as a condenser for melting the crystals, the medium condensing in the tube 75 also heats the top part of the tube.

At a distance from the product tray 85, the tube 75 has a shoulder 86 comprising e.g. a ring secured to the tube 75 and adapted to prevent the crystals forming on the tube from slipping downwards. A tube 88 for deflecting the trickling film, disposed preferably inside the tube 75, extends to the shoulder 86 and prevents crystals from forming in the region under the shoulder 86. A cavity 88' is situated between the tube 75 and the deflecting tube 88. When the crystalliser is operating as a condenser, the medium condensing in the cavity 88' on the wall of the tube 75 also heats the bottom portion of the tube 75.

Medium which has not evaporated during the crystallisation process or which condenses during melting or sweating can flow away through the spigot 94 to the liquid discharge trap 45, 46, 47 (FIG. 1). The spigot 95 is for supplying liquid medium from valve 40, 41 or 42. Spigot 96 is for discharging evaporated medium during crystallisation or for supplying gaseous medium during melting of the crystals.

Note that the crystalliser 70 is divided by the product tray 85 into two chambers 74 and 80, between which there can be considerable differences of pressure. Usually the crystallisation chamber 74 is at ambient pressure or slight excess pressure, whereas the chamber 80 containing medium is e.g. at a pressure of the order of 14 bar. It is very important to prevent the medium from flowing through a leak into the product chamber 74. In the crystalliser 70 constructed according to the invention, there are no screws attaching the crystalliser tubes 75, which could give rise to leaks. Since the medium is conveyed through a riser 87 to the top part of the tube 75, the top end 69 of the tube 75 can be closed by welding. At the bottom the tube 75 can be welded in the product tray 85, which in turn can be welded to the jacket 72 of the container 71. Welding connections of this kind are gas-tight during operation of the crystalliser. Another advantage of the construction illustrated is that the tubes 75 can move freely in the distribution tray 81. There is therefore no risk that a tube 75 will be damaged if the cooling or heating fails and it consequently contracts or expands differently from the other tubes.

The cooling plant shown in FIG. 1, which operates on a cooling medium such as ammonia or with similar properties, is particularly suitable for crystallising products having a crystallisation point below about 120° C. If the crystallisation point is in the range from approx. 100° to 230° C., water-vapour can be used instead of ammonia and the refrigerating machine 11 in FIG. 1 will not be needed.

Figure 3:
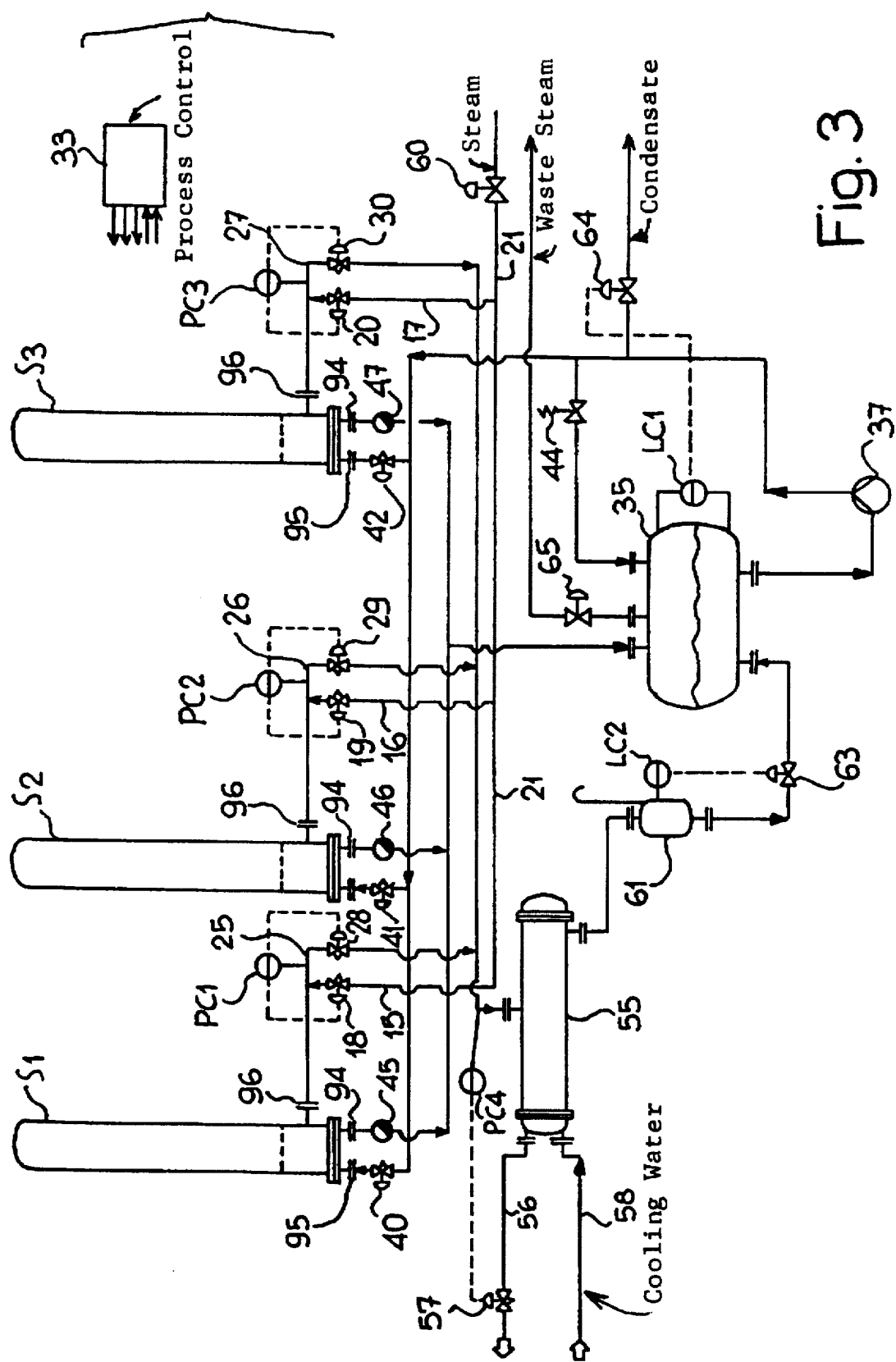
FIG. 3 shows a variant of the system in FIG. 1, for operating with steam.

FIG. 3 shows an apparatus designed for use of steam. Like references are used for like parts, as before. Since the construction of the plant in FIG. 3 is largely the same as in FIG. 1, the following description can be limited to the important differences. As already mentioned, there is no refrigerating machine, and also there is no closed circuit of medium inside the plant. Instead, steam is introduced into the plant and condensate is discharged. The resulting alterations are very small. For example the distribution pipe 21 can be connected to the steam network, instead of to a refrigerating machine, via the valve 60. Waste steam can be discharged through valve 65. Condensate, i.e. water, can be discharged from the plant if required, from the collecting tank 35 via the valve 64.

Various changes can be made without departing from the inventive principle. One alternative, in the case of a crystalliser according to DE-A-17 99 123, is to spray the liquid medium into the crystalliser in order to wet the outside of the tubes. Another alternative, for example, is multi-stage crystallisation using a single crystalliser, in which case the liquid medium produced during crystallisation can be stored in a tank for subsequent use in the crystallisation process.

I claim:

1. A method of separating substances from a liquid mixture by fractional crystallisation comprising
    depositing a crystal medium layer on one side (76) of a wall (75) of a crystalliser (S1, S2, S3, 70);
    cooling the other side (78) of said wall (75) to obtain a crystal layer; and
    subsequently melting the crystal layer,
    wherein, for the purpose of crystallisation, said method comprises the steps of
        evaporating a heat exchange medium on the said other side (78) of the wall (75); and
        controlling the pressure of the heat exchange medium in gaseous phase in the crystalliser (S1, S2, S3) in accordance with the temperature required for crystallisation.

2. A method according to claim 1, characterised in that the flow of crystal medium is controlled to trickle in a film down said one side of the wall (75, 78).

3. A method according to claim 1, characterised by
    supplying the heat exchange medium for melting the crystal layer or for sweating in the gaseous state and condensing said heat exchange medium on said other side of the wall (75), and
    controlling the pressure of the heat exchange medium in gaseous phase in accordance with the temperature required at the wall (75).

4. A method according to claim 3, characterised in that at least one crystalliser is used for crystallisation and at least one other crystalliser is used for melting the crystals,
    wherein said heat exchange medium is supplied under compression, and said step of controlling the pressure of the heat exchange medium in gaseous phase comprises
        controlling the pressure of the heat exchange medium in said one crystalliser during crystallisation by controlling the compression; and
        further including the step of controlling the pressure of said heat exchange medium in the at least one other crystalliser to determine a condensation temperature for melting the crystals in the other crystalliser.

5. A method according to claim 4, characterised by supplying external heat energy to said at least one other crystalliser by evaporating said heat exchange medium, in liquid form in an auxiliary evaporator.

6. A method according to claim 8, characterised by discharging the excess heat energy by means of an auxiliary condenser (55).

7. A method according to claim 1, characterised in that at least one crystalliser is used for crystallisation and at least one other crystalliser is used for melting the crystals,
    wherein said heat exchange medium is supplied under compression, and said step of controlling the pressure of the heat exchange medium in gaseous phase comprises
        controlling the pressure of the heat exchange medium in said one crystalliser during crystallisation by controlling the compression; and
        further including the step of controlling the pressure of said heat exchange medium in the at least one other crystalliser to determine a condensation temperature for melting the crystals in the other crystalliser.

8. A method according to claim 7, characterised by, during the melting process, supplying said at least one other crystalliser with additional external heat energy, and
    subsequently discharging the excess heat energy.

9. An apparatus for carrying out the method according to claim 1, comprising
    at least one crystalliser (70) having a casing (71);
    at least one wall (75) located in said casing, defining, on one side (76) of said wall, a separate crystallisation space (74) on which crystals can be deposited, and on the other side (78) of said wall (75), a heat exchange medium space (80);
    inlet means (95) for supplying a vaporizable heat exchange medium into said heat exchange medium space (80), whereby, in operation, at least a portion of said heat exchange medium in said medium space will assume gaseous phase;
    outlet means (94) for draining at least a portion of said vaporizable heat exchange medium in liquid phase from said heat exchange medium space (80);
    at least one connection (96) communicating with said heat exchange medium space (80) for communication with the heat exchange medium in gaseous phase; and
    pressure-control means (33; 18, 28; 19, 29; 20, 30) coupled to said heat exchange medium space (80) for controlling the pressure of the heat exchange medium, in gaseous phase, in the crystalliser.

10. Apparatus according to claim 9, characterised by an auxiliary evaporator (53) coupled to said at least one connection (96).

11. Apparatus according to claim 10, characterised by an auxiliary condenser (55) coupled to said at least one connection (96).

12. Apparatus according to claim 9, characterised in that the wall (75) is formed by at least one tube (75), optionally disposed vertically and closed at one end (69), and in that means (87) are provided for conveying liquid crystal medium to the region of the closed end (69) of the at least one tube (75), from where it can trickle in a film down the wall.

13. Apparatus according to claim 12, characterised in that the menas for supplying liquid heat exchange medium is a riser (87) within the at least one tube (75).

14. Apparatus according to claim 13, characterised by spacers (91) between the inside wall of the tube (75) to hold the riser at a distance from the wall (75) of the at least one tube.

15. Apparatus according to claim 12, comprising a number of tubes which are firmly connected to a base (85);

a distributor tray (81) at the top of the crystalliser having openings (82), through which the tubes project with a gap (83) through which a liquid mixture of crystal medium for fractionation can flow downward along the outer wall (76) of the tubes (75).

16. Apparatus according to claim 13, characterised in that the riser (87) extends only into a region below the distribution tray (81).

17. Apparatus according to claim 12, characterised in that a deflecting device (88), optionally a deflecting tube, is provided in the lower region of the outside wall (75) for the trickling film of crystallisation medium, and a cavity (88') is left between the wall (75) and the deflecting device (88).

18. Apparatus according to claim 15, characterised in that a cover (73) for a casing (71) of the crystalliser is provided, disposed above the distribution tray (81).

19. A method of separating substances from a liquid mixture by fractional crystallisation comprising depositing a crystal medium layer on one side (76) of a wall (75) of a crystalliser (S1, S2, S3, 70);

cooling the other side (78) of said wall (75) to obtain a crystal layer; and subsequently melting the crystal layer, wherein, for the purpose of crystallisation, said method comprises the steps of supplying a heat exchange medium on the other side (78) of the wall (75), whereby, by heat exchange with the crystal medium on said one side (76) of said wall (75), at least a portion of said heat exchange medium will assume gaseous phase; and controlling the pressure of the heat exchange medium in gaseous phase at the other side (78) of said wall in the crystalliser (S1, S2, S3) in accordance with the temperature required by crystallisation.

20. The method of claim 19, characterised in that at least one crystalliser is used for crystallisation and at least one other crystalliser is used for melting the crystals, wherein said heat exchange medium is supplied under compression, and said step of controlling the pressure of the heat exchange medium in gaseous phase comprises controlling the pressure of the heat exchange medium in said one crystalliser during crystallisation by controlling the compression; and further including the step of, in the at least one other crystalliser, controlling the pressure of said heat exchange medium to determine a condensation temperature for melting the crystals in the other crystalliser.

* * * * *